United States Patent
Galvano et al.

(10) Patent No.: US 9,485,818 B2
(45) Date of Patent: Nov. 1, 2016

(54) ADAPTIVE DIRECT CURRENT (DC) TO DC (DC-TO-DC) LIGHT EMITTING DIODE (LED) DRIVER FOR DYNAMIC LOADS

(71) Applicant: Infineon Technologies Dresden GmbH, Dresden (DE)

(72) Inventors: Maurizio Galvano, Padua (IT); Roberto Penzo, Chioggia (IT); Paolo Milanesi, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/575,125

(22) Filed: Dec. 18, 2014

(65) Prior Publication Data

US 2016/0183337 A1 Jun. 23, 2016

(51) Int. Cl.
H05B 33/08 (2006.01)
(52) U.S. Cl.
CPC ...... *H05B 33/0815* (2013.01); *H05B 33/0824* (2013.01); *H05B 33/0833* (2013.01); *H05B 33/0845* (2013.01)
(58) Field of Classification Search
USPC .............. 315/247, 224, 225, 149–159, 291, 315/307–326, 185 S
See application file for complete search history.

(56) References Cited

U.S. PATENT DOCUMENTS

| | | | | |
|---|---|---|---|---|
| 4,897,591 A * | 1/1990 | Spani | ..................... | H02M 3/156 320/164 |
| 2012/0274290 A1* | 11/2012 | Ye | ......................... | H02M 3/156 323/234 |
| 2013/0322122 A1* | 12/2013 | Sigamani | ............ | H02M 1/4225 363/13 |
| 2015/0256071 A1* | 9/2015 | Penzo | ................. | H02M 3/1582 315/297 |

* cited by examiner

*Primary Examiner* — Tuyet Vo
(74) *Attorney, Agent, or Firm* — Slater Matsil, LLP

(57) ABSTRACT

Current spikes may occur when dynamically shortening a light emitting diode chain. These current spikes can be avoided by using a voltage control loop to regulate the output of the LED driver just prior to the transition period. Specifically, regulation of the LED driver is switched from a current control loop (e.g., a control loop regulating the output current of the led driver) to a voltage control loop (e.g., a control loop regulating the output voltage of the led driver) just before the LED chain is shortened. The voltage control loop then reduces the voltage of the LED driver to a target voltage prior to shortening the LED chain, thereby allowing the LED chain to be shortened without eliciting a current spike.

20 Claims, 6 Drawing Sheets

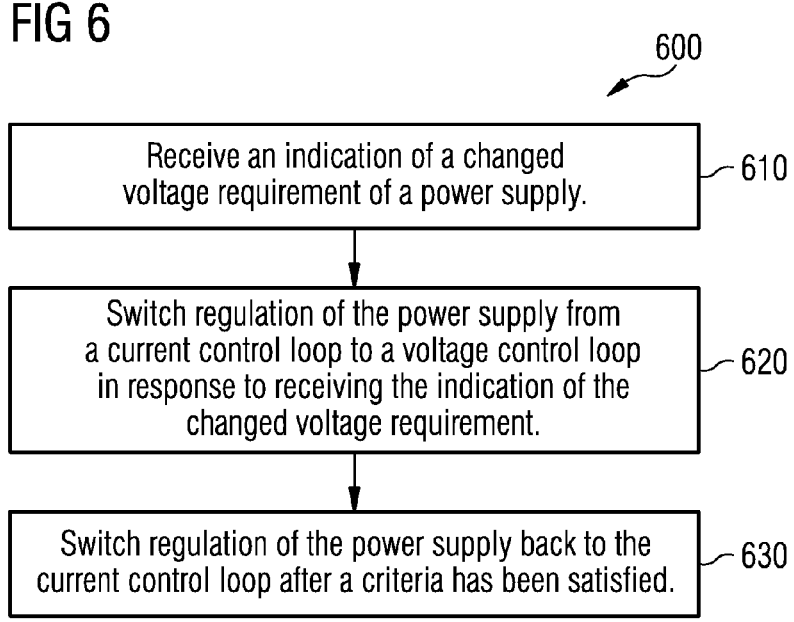
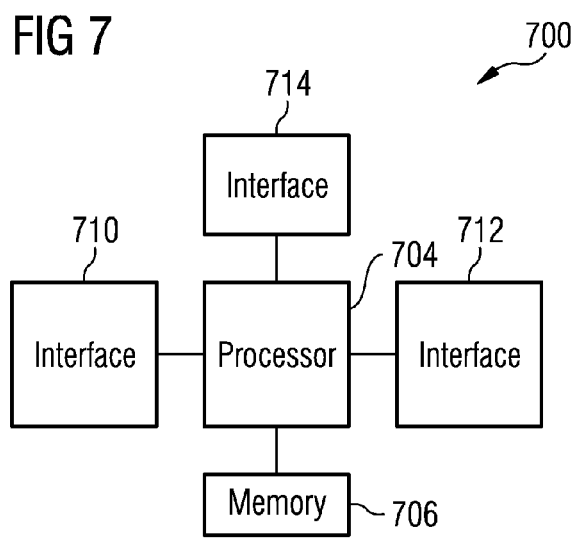

ADAPTIVE DIRECT CURRENT (DC) TO DC (DC-TO-DC) LIGHT EMITTING DIODE (LED) DRIVER FOR DYNAMIC LOADS

TECHNICAL FIELD

The present invention relates generally to power devices, and in particular embodiments, to techniques and mechanisms for adaptive direct current (DC) to DC (DC-to-DC) light emitting diode (LED) driver for dynamic loads.

BACKGROUND

Direct Current (DC) to DC (DC-to-DC) converters, may be used as drivers for loads with specific current and/or voltage requirements, such as chains of light-emitting diodes (LEDs). The light intensity of an LED chain is controlled by the amount of current flowing through it, and consequently, traditional LED drivers generally rely on a current control loop to regulate the current flowing through the LED chain. Those regulators are relatively effective at regulating power when the load is static, but may struggle to maintain a constant current when the load is abruptly changed, such as when one or more LEDs are dynamically bypassed/shorted. More specifically, dynamically shorting LEDs in the LED chain instantaneously reduces the forward voltage biasing of the LED chain, which causes the output capacitor coupled in parallel to the LED chain to discharge. Discharging of the output capacitor produces a current spike through the LED chain that has the potential to damage the remaining LEDs. The current spike may be difficult for the current control loop to regulate, as the current spike occurs relatively quickly and is driven primarily by the output capacitors, rather than the regulated power supply. Accordingly, techniques for adapting LED drivers and other power sources to dynamic load conditions are desired.

SUMMARY OF THE INVENTION

Technical advantages are generally achieved, by embodiments of this disclosure which describe adaptive direct current (DC) to DC (DC-to-DC) light emitting diode (LED) driver for dynamic loads.

In accordance with an embodiment, a method for regulating a power supply is provided. In this example, the method includes receiving an indication of a changed load condition or voltage characteristic of a power supply driving a chain of series connected circuit elements, and switching regulation of the power supply from a current control loop to a voltage control loop in response to receiving the indication of the changed load condition or voltage characteristic.

In accordance with another embodiment, an apparatus adapted to regulate a power supply is provided. In this example, the apparatus comprises a port adapted to receive an indication of a changed load condition or voltage characteristic for a power supply driving a chain of series connected circuit elements. The apparatus further comprises a controller configured to switch regulation of the power supply from a current control loop to a voltage control loop in response to receiving the changed load condition or voltage characteristic indication.

In accordance with yet another embodiment, a power supply is provided. In this example, the power supply comprises an output adapted to power a chain of series connected circuit elements. The chain of series connected circuit elements includes a first number of circuit elements during a first period. A length of the chain of series connected circuit elements is changed to a second number of circuit elements at the beginning of a second period. The power supply further comprises a first controller configured to switch regulation of the output from a current control loop to a voltage control loop before the length of the chain of series connected circuit elements is changed from the first number of circuit elements to the second number of circuit elements.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a flowchart of an embodiment method for adapting a power supply to a changing load condition; and FIG. 7 illustrates a diagram of an embodiment processing system.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure is described in the context of LED drivers, it should appreciated that the concepts provided herein are applicable to any power source adapted to drive a chain of series connected circuit elements.

Aspects of this disclosure mitigate current spikes when dynamically shortening an LED chain by using a voltage control loop to regulate the output of the LED driver just prior to the transition period. More specifically, regulation of the LED driver is switched from the current control loop (e.g., a control loop regulating the output current of the led driver) to the voltage control loop (e.g., a control loop regulating the output voltage of the led driver) just before the LED chain is shortened. The voltage control loop then reduces the voltage of the LED driver to a target voltage prior to shortening the LED chain. This gradually discharges the output capacitor, thereby allowing the LED chain to be shortened without eliciting a current spike. After the LED chain is shortened, the LED driver is switched back to the current control loop. This concept of using a voltage control loop to regulate an output voltage to a target voltage before a dynamic load event can be applied to any power device driving any chain of series connected circuit elements. These and other aspects are described in greater detail below.

Figure 1:
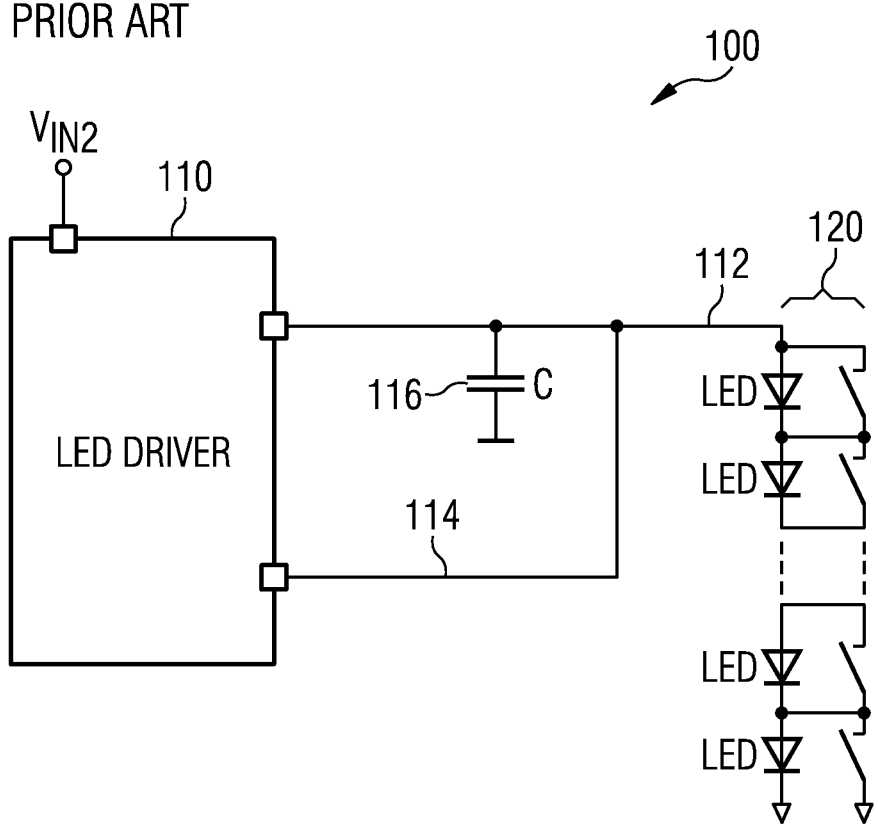
FIG. 1 illustrates a diagram of a conventional LED driver architecture.

FIG. 1 illustrates an LED driver architecture 100 comprising a conventional LED driver 110 adapted to power an LED chain 120. As shown, the conventional LED driver 110 comprises an output 112 coupled to the LED chain 120, as well a current control loop signal 114 that is used to regulates a current provided over the output 112. The light intensity of the LED chain 112 is primarily dependent on the current flowing through the LED chain 112. Accordingly, the conventional LED driver 110 uses the current control loop 114 to maintain the current level over the output 112 to regulate the brightness of the LEDs.

Figure 2:
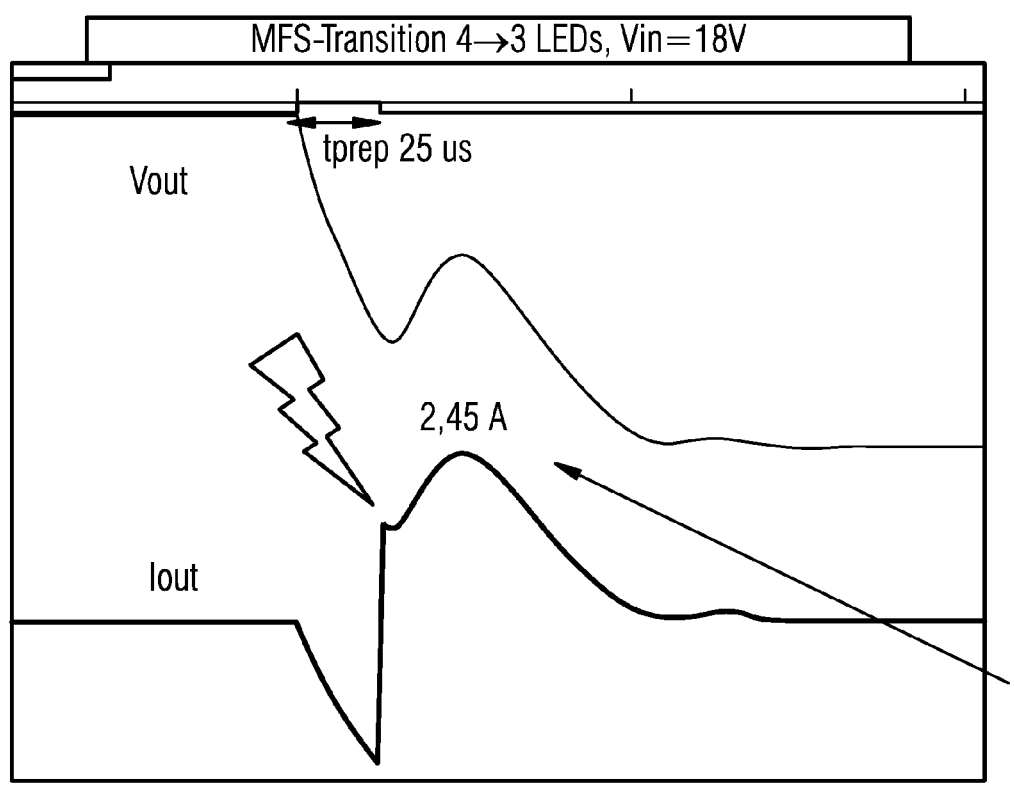
FIG. 2 illustrates a graph of a current spike over the output of a conventional LED driver experiencing a dynamic load reduction.

The number of LEDs in the LED chain 120 may be dynamically changed during operation of the conventional LED driver 110. For example, one or more of the LEDs in the LED chain 120 may be dynamically bypassed to shorten the LED chain 120, thereby instantaneously reducing the forward voltage bias across the LED chain 120. This causes the output capacitor 116 to at least partially discharge and create a current spike through the LED chain 120. The current spike is difficult to curtail from the perspective of the current control loop 114, as the current spike occurs relatively quickly and is driven primarily by the discharge of the output capacitor 116, rather than the power supplied by the conventional LED driver 110. FIG. 2 illustrates a graph of a current spike that occurs over the output 112 of the conventional LED driver 110 when the LED chain 120 is shortened from four LEDs to three LEDs. Similar issues may be present in other types of power supplies driving chains of series connected circuit elements.

Figure 3:
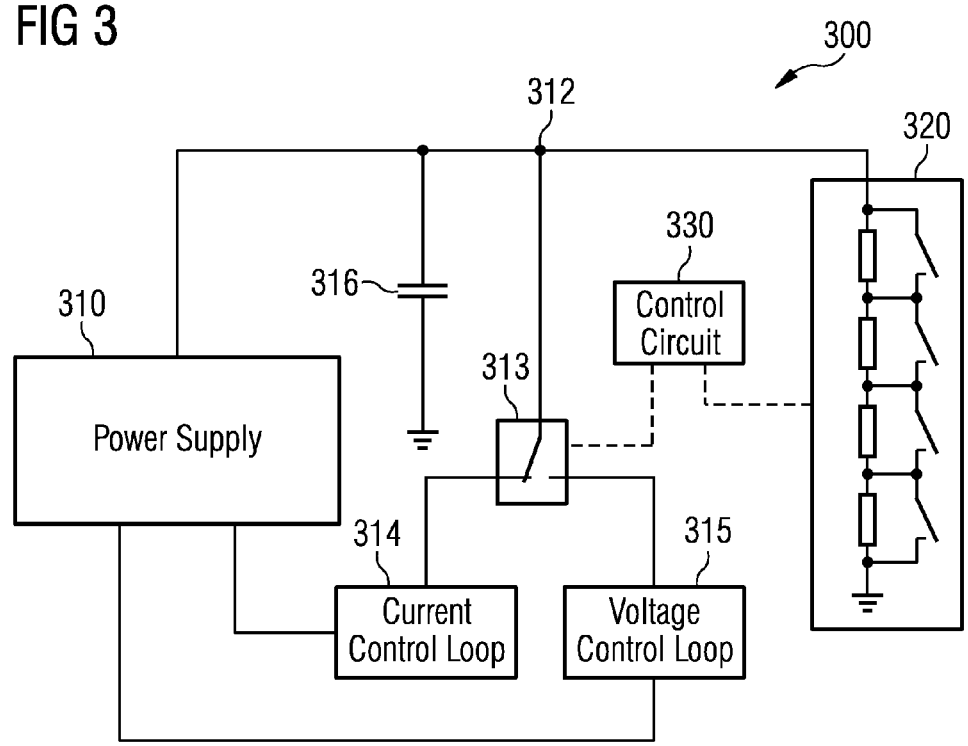
FIG. 3 illustrates a diagram of an embodiment power supply architecture.

Aspects of this disclosure mitigate current spikes when dynamically shortening a chain of series connected circuit elements by using a voltage control loop to regulate the output of the power supply just prior to the dynamic load event. FIG. 3 illustrates an embodiment power supply architecture 300 comprising a power supply 310 that is adapted to drive a chain of series connected circuit elements 320. The chain of series connected circuit elements 320 may include any type of circuit elements (e.g., diodes, resistors, capacitors, etc.) coupled in series, and may be adapted to be dynamically shortened and/or lengthened during a dynamic load event.

The control circuit 330 may manipulate a switch 313 in accordance with a state of the chain of series connected circuit elements 320. More specifically, the control circuit 330 may determine when a load condition associated with the chain of series connected circuit elements 320 is going to be dynamically changed, and then manipulate the switch 313 from the current control loop 314 to the voltage control loop 315 just prior to that dynamic load event. In an embodiment, the control circuit 330 may be adapted to determine that a load condition associated with the chain of series connected circuit elements 320 is going to be changed upon receiving an indication of a changed load condition or voltage characteristic.

Manipulation of the switch 313 from the current control loop 314 to the voltage control loop 315 may serve to activate the voltage control loop 315, as well as to deactivate the current control loop 314. Upon being activated, the voltage control loop 315 may regulate the output voltage of the power supply 310 from an initial voltage to a target voltage. The target voltage may be determined in accordance with the future load condition associated with the chain of series connected circuit elements 320. For example, the target voltage may be lower than the initial voltage when the load condition is being reduced. Conversely, the target voltage may be higher than the initial voltage when the load condition is being increased. Other conditions may also govern setting of the target voltage. Once the output of the power supply 310 is within a threshold of the target voltage, the chain of series connected circuit elements 320 can be dynamically lengthened/shortened. Thereafter, the control circuit 330 may manipulate the switch 313 from the voltage control loop 315 back to the current control loop 314.

Figure 4:
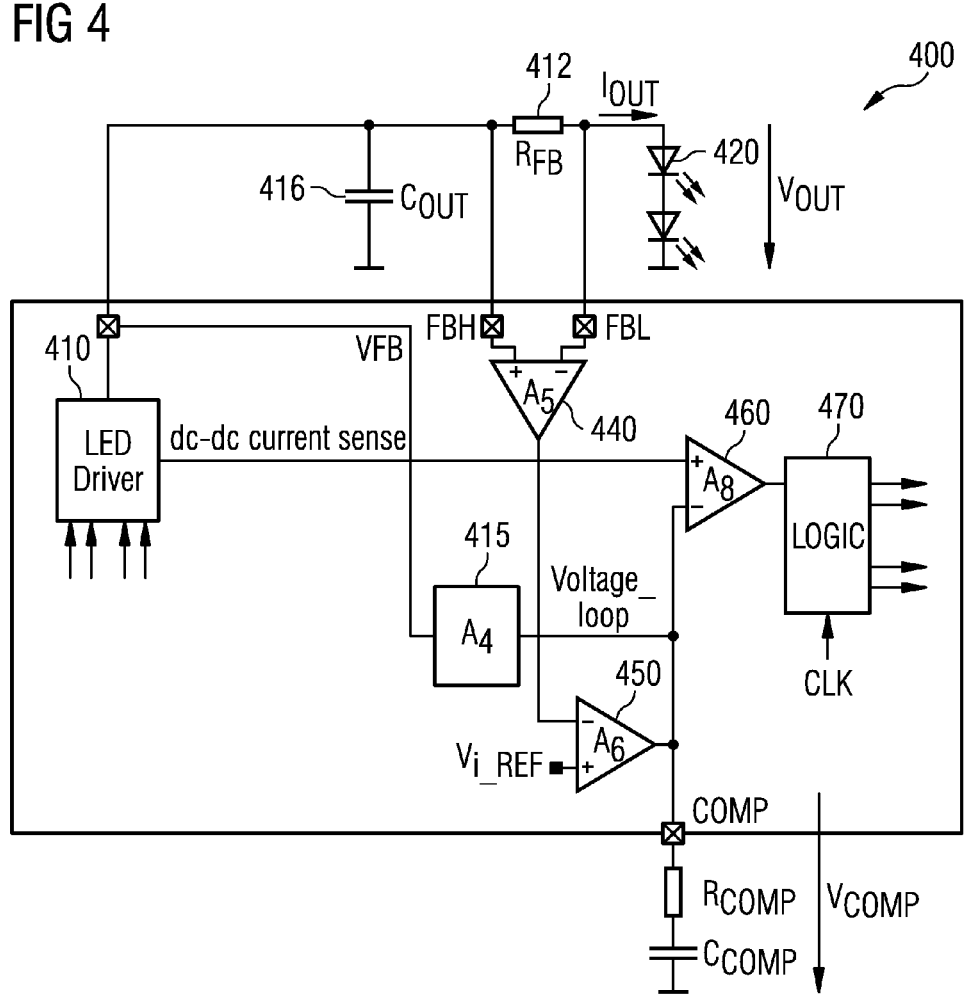
FIG. 4 illustrates a diagram of an embodiment LED driver architecture.

The above described techniques can be used to regulate any type of power source driving a chain of series connected circuit elements, including (for example) an LED driver adapted to drive a chain of LEDs. FIG. 4 illustrates an embodiment LED driver architecture 400 comprising an LED driver 410 that is adapted to drive a chain of LEDs 420. In this example, the LED driver 410 is regulated by a current control loop 440 during at least a portion of a first period during which time the chain of LEDs 420 includes a first number of LEDs. During this time, the comparator 440 measures a current being provided over the output 412, and provides a feedback signal indicative of that current to the error amplifier 450. The error amplifier 440 generates a control signal based on a difference between feedback signal and a target current (e.g., corresponding to a desired light intensity). This current control loop provides the control signal to the comparator 460 and then to the logic 470, which uses the control signal to regulate the LED driver 410.

At the beginning of a second period, the chain of LEDs 420 is dynamically shortened from a first number of LEDs to a second number of LEDs, which instantaneously reduces the forward voltage biasing of the chain of LEDs 420. Before the beginning of the second period, regulation of the LED driver 410 is switched from a current control loop (represented by the dc-dc current sense) to the voltage control loop circuit 415, at which point the voltage control loop circuit 415 regulates the output 412 of the LED driver 410 to a target voltage. This command can be sent by a micorcontroller (uC) via a Serial Peripheral Interface (SPI) or an auxiliary pin adapted for this function. More specifically, the voltage control loop circuit 415 receives a voltage feedback (VFB) signal from the LED driver, and then provides a control signal to the comparator 460, and then to the logic 470, to gradually reduce the output voltage of the LED driver 410. The voltage control loop circuit 415 may also determine the number of series-connected LED modules during the first period and the number of series-connected LED modules that will be present at the beginning of the second period. This information will be used by the voltage control loop circuit 415 to calculate the target voltage. The information may be pre-configured if the load step is fixed, e.g., the load changes a fixed amount during transition periods. The information can also be dynamically communicated to the voltage control loop 415 using, for example, an Serial Peripheral Interface (SPI) by a microcontroller (uC). The voltage control loop circuit 415 stops reducing, and maintains, the output voltage of the LED driver once the voltage feedback (VFB) signal is within a threshold of the target voltage. In an embodiment, the voltage control loop circuit 415 determines the target voltage in accordance with a ratio between the first number of circuit elements and the second number of circuit elements. For example, the voltage control loop 415 may multiply the initial voltage of the output 412 by the ratio between the first number of circuit elements and the second number of circuit elements. Reducing the output voltage of the LED driver 410 gradually discharges the output capacitor 416. Once the output voltage of the LED driver 410 is regulated at or near the target voltage, the chain of LEDs 420 can be dynamically shortened without risk of a current spike. After the chain of LEDs 420 is shortened, regulation of the LED driver 410 is switched back to the current control loop.

Figure 5:
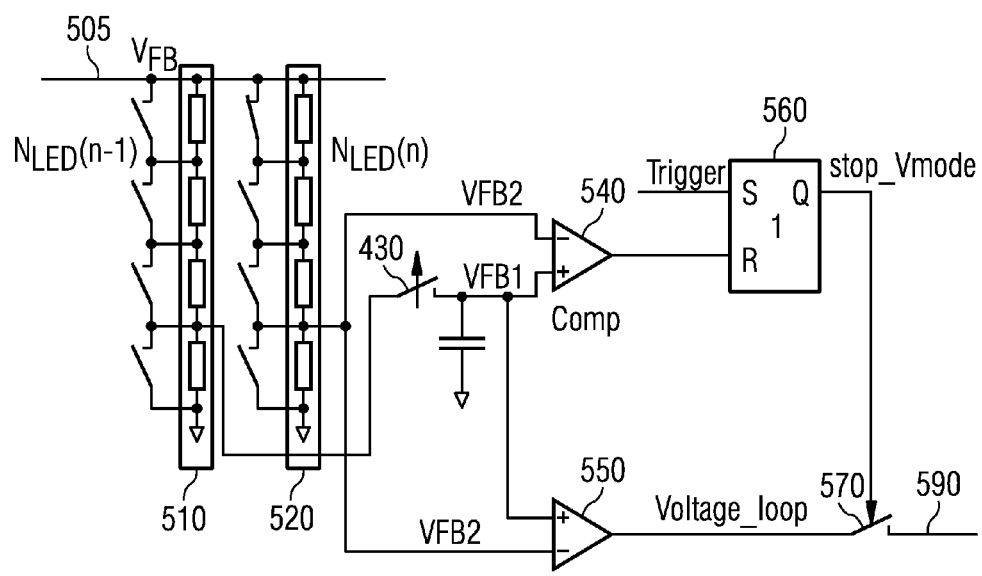
FIG. 5 illustrates a diagram of an embodiment voltage control loop.

FIG. 5 illustrates a voltage control loop circuit 500 adapted to regulate the output of a power supply that drives a chain of series connected circuit elements (e.g., LEDs, etc.) during a transition period. As discussed herein, the term "transition period" refers to the period over which the output voltage of a power supply is transitioned from an initial voltage to a target voltage to prepare for a dynamic change in load, e.g., lengthening/shortening of a chain of serially connected circuit elements, etc.

As shown, the voltage control loop 500 includes an input port 505, voltage dividers 510, 520, a switch 530, a comparator 540, an error amplifier 550, a controller 560, a switch 570, and an output port 590. The voltage control loop circuit 500 is adapted to regulate the power supply from an initial output voltage to a target output voltage by manipulating resistances of the voltage dividers 510, 520 in accordance with a ratio between an initial load (e.g., the number of circuit elements in the chain prior to changing the chain's length) and a final load (e.g., the number of circuit elements in the chain after changing the chain's length). The number of resistors in the voltage dividers 510 and 520 may be equal to the max number of LEDs that can be connected to the output. The voltage divider 510 represents the load during the first period, and the voltage divider 520 represents the target load at the beginning of the second period. For example, if the load is being decreased from four LEDs to three LEDs, then the voltage divider 510 will have four series-connected resistors and the voltage divider 520 will have three series-connected resistors. This concept is illustrated by the following:

Max output leds in series 4→number of resistor bank=4
example:
starting from $N_{LED}(n-1)=4$ new LED chain $N_{LED}(n)=3$
$V_{LED}=3V$
$V_{FB}(n-1)=3V*4=12V \rightarrow V_{FB}(n)=3V*3=9V$
$V_{FB1}=V_{FB}*\frac{1}{4}$ $V_{FB2}=V_{FB}*\frac{1}{3}$
$V_{FB1}(n-1)=12*\frac{1}{4}=3V$ hold voltage on V+comparator
$V_{FB2}(n-1)=12*\frac{1}{3}=4V$ after dose the loop→$V_{FB}(n)$ =3*3=9V→3 LEDs The input port 505 is configured to receive a feedback signal ($V_{FB}$) that is indicative of the output voltage of the power supply. For example, the feedback signal ($V_{FB}$) indicates that the output voltage is approximately equal to the initial voltage at the beginning of the transition period. The feedback signal then flows over the respective voltage dividers 510, 520, after which the outputs of the voltage dividers 510, 520 are sampled to obtain a first sampled signal (VFB1) The comparator 540 outputs a signal to the controller 560 when the difference between VFB1 and VFB2 exceeds a threshold, which prompts the controller 560 to open the switch 570. The switch 530 and 570 are controlled by the external pin or SPI commend. Before the beginning of the second period, the switch 430 is closed and the switch 570 is open, after the command the switch 430 will be open. Opening the switch 430 stores the initial value of the first sampled signal (VFB1($n$-1)) in the capacitor, while closing the switch 570 allows an error correction signal from the error amplifier 550 to regulate the power supply.

The error correction signal has a magnitude that corresponds to a difference between the initial value of the first sampled signal (VFB1($n$-1)) and the present value of the second sampled signal (VFB2($n$)). The output voltage of the power supply may be reduced in accordance with the magnitude of the error correction signal. For example, the output voltage of the power supply may be reduced at a fixed rate so long as the magnitude of the error correction signal exceeds a threshold. As another example, the output voltage of the power supply may be reduced at a rate that is inversely proportional to the magnitude of the error correction signal, in which case the rate of voltage regulation decreases as the output voltage of the power supply approaches the target voltage.

Aspects of this disclosure provide methods for adapting power supplies to changing load conditions. FIG. 6 illustrates a method 600 for adapting a power supply to a changing load condition, as might be performed by a controller. As shown, the method 600 begins at step 610, where the controller receives an indication of a changed load condition or voltage characteristic of the power supply. This may occur as a result of determining that a load condition of the power supply will change at some point in the future. Thereafter, the method 600 proceeds to step 620, where the controller switches regulation of the power supply from a current control loop to a voltage control loop in response to receiving the indication of the changed load condition or voltage characteristic. Next, the method 600 proceeds to step 630, where the controller Switch regulation of the power supply back to the current control loop after a criteria has been satisfied, e.g., a load condition of the power supply has stabilized, etc.

FIG. 7 illustrates a block diagram of a processing system 700 that may be used for implementing the devices and methods disclosed herein. The processing system 700 may include a processor 704, a memory 706, and a plurality of interfaces 710-714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710-714 may be any component or collection of components that allows the processing system 700 to communicate with other systems and/or devices. The interfaces 710-714 may include serial interfaces (e.g., a Serial Peripheral Interface (SPI), Universal Serial Bus (USB), etc.), parallel interfaces, or combinations thereof.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:
1. A method comprising:
receiving an indication of a changed load condition or voltage characteristic of a power supply driving a chain of series connected circuit elements; and switching regulation of the power supply from a current control loop to a voltage control loop in response to receiving the indication of the changed load condition or voltage characteristic, wherein the chain of series connected circuit elements includes a first number of circuit elements during a first period, and wherein the indication of the changed load condition or voltage characteristic is received prior to a length of the chain of series connected circuit elements being changed from the first number of circuit elements to a second number of circuit elements at a beginning of a second period.

2. The method of claim 1, further comprising:
switching regulation of the power supply back to the current control loop after the length of the chain of series connected circuit elements has been changed from the first number of circuit elements to the second number of circuit elements.

3. The method of claim 1, further comprising:
determining a target voltage of the power supply for the second period in accordance with a ratio between the first number of circuit elements and the second number of circuit elements; and
changing an output of the power supply from an initial voltage to the target voltage prior to the length of the chain of series connected circuit elements being changed from the first number of circuit elements to the second number of circuit elements.

4. The method of claim 3, wherein determining the target voltage of the power supply for the second period comprises:
dividing the initial voltage by the ratio between the first number of circuit elements and the second number of circuit elements.

5. The method of claim 3, wherein changing the output of the power supply from the initial voltage to the target voltage comprises:
receiving a feedback signal indicating an output voltage of the power supply;
producing an compensating error voltage signal in accordance with a difference between the output voltage of the power supply and the target voltage; and
providing the compensating error voltage signal to a control port of the power supply until the difference between the output voltage of the power supply and the target voltage is less than a threshold.

6. The method of claim 1, wherein the chain of series connected circuit elements comprises a chain of light emitting diodes (LEDs) that is shortened from a first number of LEDs to a second number of LEDs at the beginning of the second period.

7. The method of claim 6, wherein the power supply is a direct current (DC) to DC (DC-to-DC) LED driver having an output that is reduced from an initial voltage to a target voltage prior to the chain of LEDs being shortened from a first number of LEDs to a second number of LEDs.

8. The method of claim 7, wherein an output capacitor coupled in parallel with the chain of LEDs is at least partially discharged when the output of the DC-to-DC LED driver is reduced from the initial voltage to the target voltage.

9. An apparatus comprising:
a port adapted to receive an indication of a changed load condition or voltage characteristic for a power supply driving a chain of series connected circuit elements; and a controller configured to switch regulation of the power supply from a current control loop to a voltage control loop in response to receiving the changed load condition or voltage characteristic indication, wherein the chain of series connected circuit elements includes a first number of circuit elements during a first period, and wherein the changed load condition or voltage characteristic indication is received prior to a length of the chain of series connected circuit elements being changed from the first number of circuit elements to a second number of circuit elements at a beginning of a second period.

10. The apparatus of claim 9, wherein the controller is further configured to switch regulation of the power supply back to the current control loop after the length of the chain of series connected circuit elements has been changed from the first number of circuit elements to the second number of circuit elements.

11. The apparatus of claim 9, further comprising:
the voltage control loop, wherein the voltage control loop is configured to determine a target voltage of the power supply for the second period in accordance with a ratio between the first number of circuit elements and the second number of circuit elements, and to change an output of the power supply from an initial voltage to the target voltage prior to the length of the chain of series connected circuit elements being changed from the first number of circuit elements to the second number of circuit elements during the second period.

12. The apparatus of claim 11, wherein the voltage control loop is adapted to determine the target voltage of the power supply for the second period by dividing the initial voltage by the ratio between the first number of circuit elements and the second number of circuit elements.

13. The apparatus of claim 11, wherein the voltage control loop is adapted to change the output of the power supply from the initial voltage to the target voltage by:
receiving a feedback signal indicating an output voltage of the power supply;
producing a compensating error voltage signal in accordance with a difference between the output voltage of the power supply and the target voltage; and
providing the compensating error voltage signal to a control port of the power supply until the difference between the output voltage of the power supply and the target voltage is less than a threshold.

14. A power supply comprising:
an output adapted to power a chain of series connected circuit elements, the chain of series connected circuit elements including a first number of circuit elements during a first period, wherein a length of the chain of series connected circuit elements is changed to a second number of circuit elements at a beginning of a second period; and
a first controller configured to switch regulation of the output from a current control loop to a voltage control loop before the length of the chain of series connected circuit elements is changed from the first number of circuit elements to the second number of circuit elements.

15. The power supply of claim 14, wherein the first controller is further configured to switch regulation of the output back to the current control loop after the length of the chain of series connected circuit elements is changed from the first number of circuit elements to the second number of circuit elements.

16. The power supply of claim 14, wherein the power supply is a direct current (DC) to DC (DC-to-DC) LED driver adapted to drive a chain of light emitting diodes (LEDs) that is shortened from a first number of LEDs to a second number of LEDs at the beginning of the second period.

17. The power supply of claim 14, further comprising the voltage control loop, the voltage control loop including:
- an input port configured to receive a feedback signal comprising an output voltage being provided over the output of the power supply;
- a first voltage divider coupled to the input port;
- a second voltage divider coupled to the input port, the second voltage divider being coupled in parallel with the first voltage divider;
- an error amplifier configured to sample outputs of the first voltage divider and the second voltage divider, and to provide a compensating error voltage based on a difference between the sampled outputs; and
- a second controller adapted to set resistances of the first voltage divider and the second voltage divider in accordance with a ratio between the first number of circuit elements and the second number of circuit elements.

18. The power supply of claim 17, wherein the voltage control loop further comprises:
- a comparator configured to sample outputs of the first voltage divider and the second voltage divider, and to provide a switching signal to the first controller when a voltage difference between the sampled outputs falls below a threshold, the switching signal prompting the first controller to switch regulation of the output back to the current control loop.

19. A method comprising:
- receiving an indication of a changed load condition or voltage characteristic of a power supply driving one or more circuit elements; and
- switching regulation of the power supply from a current control loop to a voltage control loop in response to receiving the indication of the changed load condition or voltage characteristic, wherein
  - a number of the one or more circuit elements includes a first number of circuit elements during a first period, and
  - the indication of the changed load condition or voltage characteristic is received prior to the number of the one or more circuit elements being changed from the first number of circuit elements to a second number of circuit elements at a beginning of a second period.

20. The method of claim 19, wherein the one or more circuit elements include a light emitting diodes (LED).

* * * * *